Figure 1:
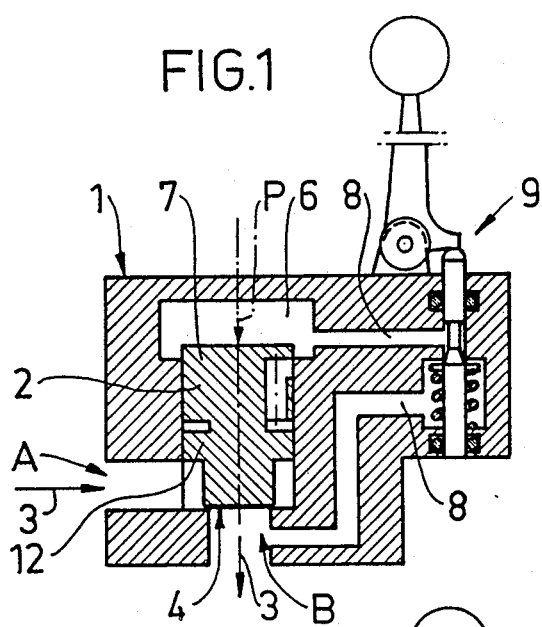

United States Patent [19]

Andersson

[11] Patent Number: 4,905,959
[45] Date of Patent: Mar. 6, 1990

[54] PRESSURE MEDIUM VALVE
[75] Inventor: Bo Andersson, Skellefteå, Sweden
[73] Assignee: Bahco Hydrauto AB, Skellefteå, Sweden
[21] Appl. No.: 263,406
[22] Filed: Oct. 27, 1988
[30] Foreign Application Priority Data
   Oct. 27, 1987 [SE] Sweden .................................. 8704177
[51] Int. Cl.⁴ .......................................... F16K 31/124
[52] U.S. Cl. .......................................... 251/35; 251/44
[58] Field of Search .................. 137/489.3; 251/35, 44
[56] References Cited
   U.S. PATENT DOCUMENTS
   1,046,236 12/1912 Wagner .................................. 251/35
   2,055,576  9/1936 Hollerith ............................... 251/35
   4,535,809  8/1985 Andersson ....................... 137/596.14
   4,779,836 10/1988 Marklund .......................... 251/44 X Primary Examiner—Gerald A. Michalsky
Attorney, Agent, or Firm—Burns, Doane, Swecker & Mathis

[57] ABSTRACT

Pressure medium valve having a valve piston located in a valve housing for control of a main pressure medium flow through the valve by the aid of a pilot flow through a variable pilot flow restriction disposed in the valve piston, the pilot flow being derived from the main pressure medium flow and being controllable by means of a control pilot valve. To achieve temperature independent control without area increase in the pilot flow chambers, an additional restriction between the valve piston and the cylindrical wall surrounding the valve piston of the valve housing is incorporated. The additional restriction has the form of a peripheral clearance of a substantially greater axial length than height.

5 Claims, 1 Drawing Sheet

U.S. Patent    Mar. 6, 1990    4,905,959

4,905,959

PRESSURE MEDIUM VALVE

This invention relates to a pressure medium valve having a valve piston located in a valve housing for stepless control of a main pressure medium flow through the valve by the aid of a pilot flow through a variable pilot flow restriction disposed in the valve piston, said pilot flow deriving from the main pressure medium flow and being adjustable by means of a control pilot valve.

This type of pressure medium or hydraulic valves is previously known and often used as seat valves, above all where a stepless control of a main pressure medium flow is desired. These known valves comprise a valve piston which is movable within its valve housing from a closed position to a completely open position and, independently of the existing hydraulic pressure before as well as after the valve, is steplessly variable to each position between said closed and completely open positions by means of a pilot flow deriving from the main pressure medium flow through a variable pilot flow restriction located in the valve piston and to a pilot flow chamber in the valve housing in order to control steplessly the quantity of main pressure medium allowed to flow per time unit through the valve. As a rule this variable pilot flow restriction has the form of slots arranged symmetrically in the valve piston and connecting the valve inlet with the pilot flow chamber of the valve, the same pressure being obtained in this chamber as in the inlet of the valve as long as no pilot flow exists. The pressure prevailing in the pilot flow chamber gives rise to retaining force acting on the rear end surface of the valve piston facing the pilot flow chamber, said retaining force being, owing to the existing area conditions, greater than the opposite directed force, dependent on the pressure in the inlet of the valve and acting on the leading end surfaces of the valve piston facing the pressure side of the valve. In this way said retaining force maintains the valve piston in the closed position as long as there is no pilot flow. The pilot flow is controlled by means of a control pilot valve arranged in a pilot flow channel from the pilot flow chamber of the valve to the main pressure medium flow after the valve.

The stepless control ability of this type of pressure medium valves is quite dependent on the pilot flow which may not be restrictively influenced to any appreciable extent, by neither the pilot flow channels nor anything else. However, it has appeared that such an influence may occur in particular at very low temperatures when the pressure medium used such as hydraulic oil is very viscous in its channels. In order to obtain a satisfactory control possibility at low temperatures, also, the pilot flow channels have been designed with relatively large areas in comparison with the flow area of the associated control pilot valve. Thanks to this measure the pilot flow can be controlled completely by the control pilot valve but this measure is contrary to the desired aim from considerations of space to be able to make the pilot flow channels as narrow as possible.

It is therefore the object of this invention to solve this problem and, thus, to obtain extraordinary control possibilities independent of temperature in pressure medium valves of the type indicated above without disregarding the above-mentioned desideratum as to the area of the pilot flow channels.

This object is achieved in that the pressure medium valve of the present invention has been given the characteristic features defined in the appended claims, one principal characteristic feature being the arrangement of a further restriction, in addition to the variable pilot flow restriction, between the valve piston and the wall of the valve housing surrounding said piston, said restriction having the form of a peripheral slot of a substantially greater axial length than height.

Figure 2:
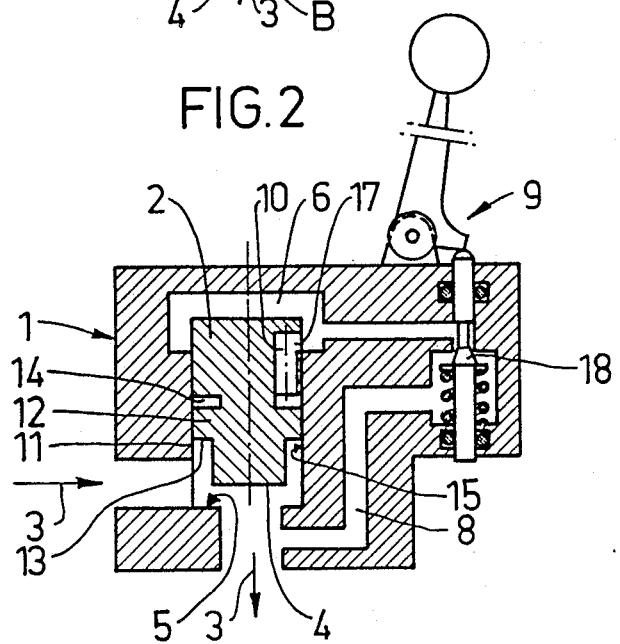
Figure 3:
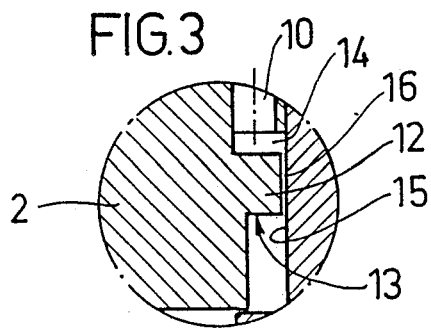

The invention is described in the following in greater detail with reference to the enclosed drawing, wherein FIGS. 1 and 2 show sections of a pressure medium valve formed according to this invention in closed and partly open positions, respectively, and FIG. 3 shows a detail of a characterizing feature of the pressure medium valve on a larger scale.

The pressure medium valve shown on the drawing comprises a valve housing 1 with a valve piston 2 movably arranged therein with a close fit, said valve piston being shown in FIG. 1 in a closed position and consequently closing the inlet A and outlet B of the valve and in FIG. 2 in a partly open position, in which the inlet A and outlet B of the valve are connected to each other and enable a main pressure medium flow to pass the valve in the direction indicated by the arrows 3.

The valve piston 2 has an end surface 4 closing the outlet B of the valve in coaction with a seat surface 5 arranged in the valve housing 1 and surrounding the outlet B, and the valve piston 2 is maintained in its closed position by means of a retaining force P acting on the rear end surface 7 of the valve piston turned from the pressure side of the valve and located in the space 6 formed in the valve housing 1 as pilot flow chamber. This pilot flow chamber 6 is connected through a pilot flow channel 8 to the main pressure medium flow controlled by the valve after the valve piston 2, and in this pilot flow channel a control pilot valve 9 is arranged. Thus, a pilot flow from the pilot flow chamber 6 can be obtained by the aid of this control pilot valve and the main flow is controlled by means of this pilot flow through the valve completely independently of the pressure thanks to the fact that the valve piston 2 is caused to move from its closed position to any desired open position by the pilot flow.

The pilot flow derives from the main flow before or in the inlet A of the valve, and a slot or hole 10 operating as a variable restriction is formed in the mantle surface of the valve piston for leading the pilot flow to the pilot flow chamber, said slot or hole 10 having a certain connection also in the closed position of the valve piston with the pilot flow chamber 6 and with the inlet A of the valve. This latter connection consists of a clearance 11 (FIG. 3) between a cylindrical portion 12 of the valve piston 2 which is restricted by an annular end surface 13 and a peripheral, radial groove 14 made in the valve piston 2, said groove being connected to the hole 10. The cylindrical portion 12 of the valve piston has a diameter that should be smaller than the diameter of the cylindrical space 15 in which the valve piston 2 is movably arranged within its valve housing 1 to obtain said clearance 11, the length of which should be several times greater in axial direction than its height, the clearance 11 forming at its inlet a restriction 16 and a laminar flow being obtained in said clearance 11 giving rise to an extra pressure drop, and in this way the pilot flow from the pressure side of the valve, i.e. from the inlet A to the pilot flow chamber 6, will be less sensitive to the temperature dependent flowability of the pressure medium used, and as a consequence of this the size of the area of the pilot flow channels will have less influence on the pilot flow. The valve will be so to say temperature compensated.

The pilot valve 9 arranged in the pilot flow channel 8 is controllable steplessly between its two end positions, viz a closed position and an open one, and in the closed position it prevents outflow of pressure medium from the pilot flow chamber 6 within the valve housing 1, and consequently the same pressure is created in this chamber 6 as in the inlet A of the valve as the pressure is always higher on the inlet side of the valve than on its outlet side. This pressure prevailing in the pilot flow chamber 6 gives rise to the retaining force P acting on the end surface 7 of the valve piston which is greater, dependent on the area conditions, than the force of opposite direction depending on the pressure in the inlet A and maintaining in this way the valve piston 2 in a closed position as long as the pilot valve 9 is closed.

Thus, as soon as the pilot valve is opened a pilot flow will also arise from the inlet A to the pilot flow chamber 6 via the clearance 11, the radial groove 14 in the valve piston 2 and the hole 10, and thanks to the slight height and great length of the clearance relative to its height a laminar flow is obtained in the clearance 11 resulting in said extra drop of pressure in addition to that obtained in the opening 17 in the mantle surface of the valve piston of the hole functioning as a variable restriction, and thanks to this extra pressure drop a possible pressure drop in the pilot flow channel 8 is compensated.

As the height of said clearance can be made relatively small and less than a tenth of a millimeter said clearance 11 also serves as a filter for particles which are prevented in this way from accompanying the pilot flow and depositing on the valve cone 18 of the pilot valve which, as a rule, is sensitive to impurities, and therefore an increased safety is obtained as far as the function of the valve arrangement is concerned. Thanks to the peripheral clearance 11 and the radial, also peripheral groove 14 only one slot or hole 10, 17 serving as a variable restriction and ending in the pilot flow chamber 6 is required to achieve such a rotation symmetry that an extraordinary distribution of the pilot flow is obtained independently of the position of the vale piston relative to the valve housing which, in turn, leads to lower demands on precision for the embodiment of the valve housing and the valve piston, and consequently a simpler embodiment of the valve which requires less manufacturing costs is attained.

The invention is not restricted to what has been described above and shown on the drawing but it can be changed, modified and supplemented in many different ways within the scope of te inventive idea defined in the claims. As to the ratio of the length of the clearance 11 to its height it can be mentioned, for example, that the length with advantage can be at least 10 times greater than the height, but many other ratios have also been found to give very satisfactory results.

I claim:

1. Pressure medium valve comprising:
    a valve housing with an inlet and an outlet for a main pressure medium flow through the valve,
    a valve piston located within said housing and surrounded by a cylindrical wall, said valve piston controlling said main pressure medium flow through the valve according to a pilot flow, said pilot flow being derived from the main flow at the valve inlet and passing through a variable pilot flow restriction in the piston to the valve outlet,
    a control pilot valve located between said variable pilot flow restriction and said valve outlet in a pilot flow passage for said pilot flow, said control pilot valve controlling said pilot flow from the inlet to the outlet of the valve,
    said valve piston having an additional restriction for the pilot flow, said additional restriction being located in front of said variable restriction with respect to the direction of the pilot flow and comprising a peripheral clearance between the valve and the cylindrical wall surrounding said valve, said peripheral clearance having a substantially greater axial length than height.

2. A pressure medium valve according to claim 1 wherein the length of said clearance is several times greater than the height.

3. The device as claimed in claim 2, characterized in that the length of the clearance is at least 10 times greater than its height.

4. A pressure medium valve according to claim 1 wherein said piston has a peripheral radial groove located between said variable pilot flow restriction and said additional restriction.

5. A pressure medium valve according to claim 4 wherein said additional restriction is located between said peripheral radial groove and a small diameter end portion of the piston, said end portion of the piston serving to close the outlet of the valve.

* * * * *